United States Patent Office 2,811,995
Patented Nov. 5, 1957

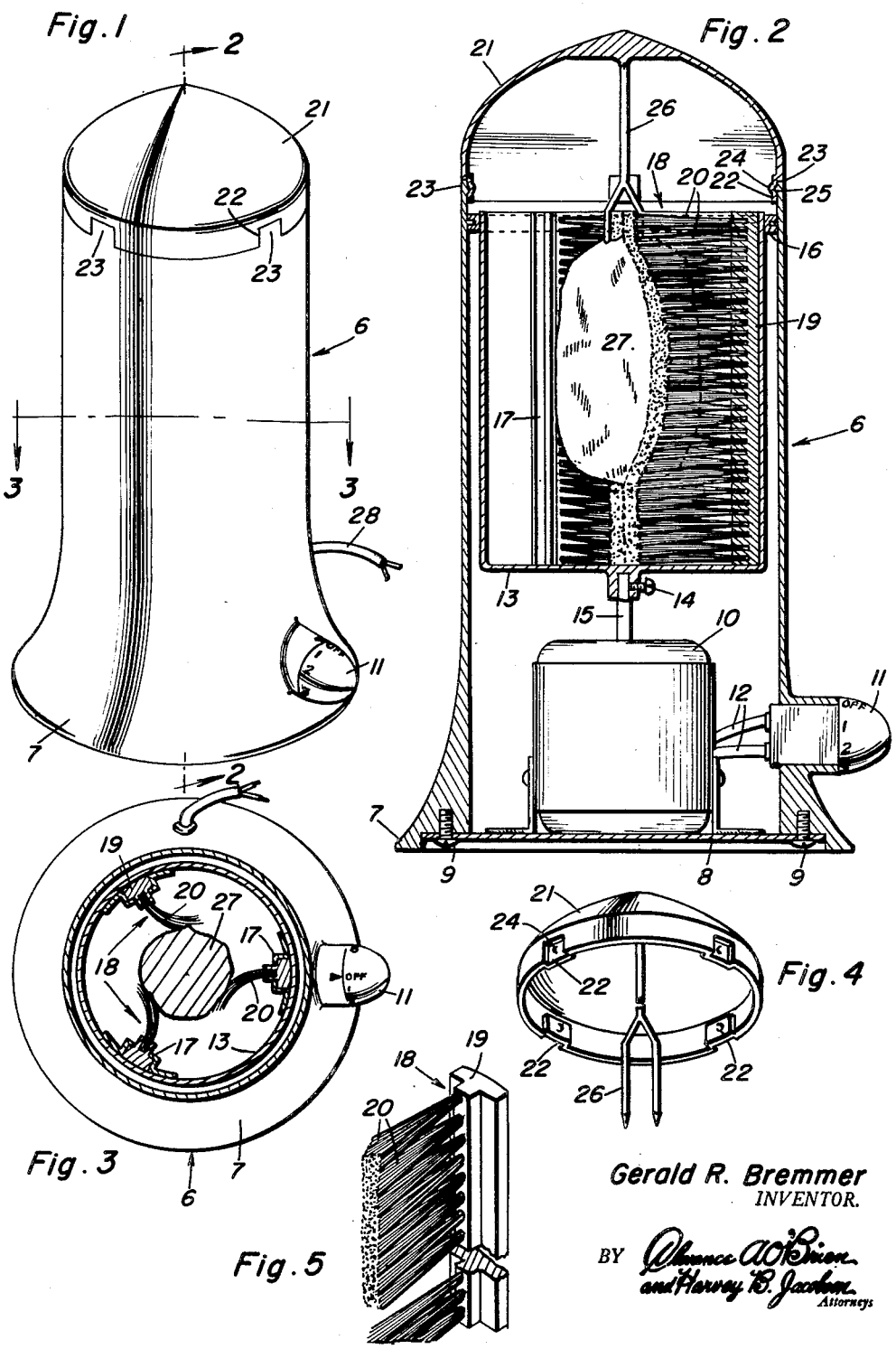

2,811,995
POTATO PEELER
Gerald R. Bremmer, Grand Haven, Mich.
Application June 14, 1955, Serial No. 515,313
4 Claims. (Cl. 146—49)

The present invention relates to new and useful improvements in potato peelers, particularly for domestic use, and has for its primary object to provide, in a manner as hereinafter set forth, a power driven appliance of this character comprising novel means for rapidly and safely removing the skin of a potato placed therein.

Another important object of the invention is to provide a potato peeler of the aforementioned character which will readily accommodate potatoes of various sizes without the necessity of making any adjustments.

Other objects of the invention are to provide a potato peeler of the character described which will be comparatively simple in construction, strong, durable, compact, highly efficient and reliable in use, attractive in appearance and which may be manufactured at low cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view of a potato peeler constructed in accordance with the present invention;

Figure 2 is an enlarged vertical sectional view, taken substantially on the line 2—2 of Figure 1;

Figure 3 is a view in horizontal section, taken substantially on the line 3—3 of Figure 1;

Figure 4 is a perspective view of the removable cover; and

Figure 5 is a perspective view of one of the removable brushes.

Referring now to the drawing in detail, it will be seen that the embodiment of the invention which has been illustrated comprises a substantially cylindrical, stationary housing of suitable dimensions and material which is designated generally by reference character 6. The housing 6 includes an externally flared lower end portion or base 7. Recessed into the lower end portion of the housing 6 is a bottom 8 which is secured by machine screws 9.

Mounted centrally in the cylindrical housing 6 on the bottom 8 thereof is a vertical electric motor 10. A variable speed control switch 11 is mounted on the lower portion of the housing 6 and electrically connected to the motor 10, as indicated at 12.

Mounted for rotation in the upper portion of the housing 6 in spaced, concentric relation thereto is a substantially cup-shaped container 13. The container 13 is fixedly secured, as indicated at 14, on the upper end portion of the vertical shaft 15 of the electric motor 10. A lubricant saturated bearing ring 16 of felt or other suitable material is provided in the upper portion of the housing 6 for the rotary container 13.

Mounted vertically in the container 13 at circumferentially spaced points are pairs of spaced, opposed guides or holders 17 of angular cross-section. Removably mounted in the pairs of holders 17 are inwardly radiating brushes 18. The brushes 18 include backs 19 of substantially T-shaped cross-section which are slidably insertable between the pairs of holders 17 from the upper ends thereof and which project inwardly through the spaces therebetween. The brushes 18 further include suitable bristles 20 mounted on the backs 19.

Removably mounted on the upper end of the housing 6 is a substantially dome-shaped cover 21. The lower portion of the cover 21 is recessed at circumferentially spaced points for the reception of upstanding tongues or clips 23 on the housing 6. The recesses 22 are provided with indentations 24 for the reception of protuberances 25 on the tongues 23 for securing the cover 21 in position. The construction and arrangement of parts is such as to positively secure the cover 21 against rotation on the housing 6.

Mounted centrally in the removable cover 21 and depending therefrom into the container 13 is a forked hanger 26. The potato to be peeled, as indicated at 27, is impaled on the forked hanger 26 between the brushes 18.

It is thought that the operation of the device will be readily apparent from a consideration of the foregoing. Briefly, the cover 21 is removed and the potato 27 is impaled on the holder or hanger 26. The cover 21 is then replaced on the housing 6 thereby suspending the potato 27 in the container 13 between the brushes 18. The electric motor 10 is then energized for rotating the container 13 at the desired speed. In this manner, the stationary potato 27 is rapidly peeled by the bristles 20 of the brushes 18 rotating about said potato. As hereinbefore stated, the speed of the electric motor 10 may be regulated as desired through the medium of the variable control switch 11. The bearing ring 16 lubricates and stabilizes the rotating container 13. The removable brushes 18 facilitate cleaning the container 13 and maintaining the device in a sanitary condition. A conductor cord 28 connects the motor 10 to any suitable source of electricity.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A potato peeler of the character described comprising: a housing open at its upper end, a cover removably mounted on said housing, means on said cover for suspending a potato to be peeled in the housing, a plurality of brushes rotatably mounted in the housing and engageable with the potato for removing the skin thereof, and means in the housing for actuating said brushes.

2. A potato peeler of the character described comprising: a housing including a removable cover, a plurality of brushes mounted to revolve in said housing, means on the cover for suspending a potato in the housing between the brushes for engagement thereby, and means in the housing for revolving the brushes about the potato.

3. A potato peeler of the character described comprising: a vertical cylindrical housing including a removable cover, an electric motor mounted vertically in the housing, a rotary container in the housing mounted on the motor for actuation thereby, a plurality of radial brushes mounted vertically in the container, and means in the cover for fixedly suspending a potato in the container for engagement by the brushes.

4. A potato peeler of the character described comprising: a substantially cylindrical, vertical housing open at its upper end, a cover removably mounted on said upper end of said housing, an electric motor mounted vertically in the lower portion of the housing, a substantially cup-shaped container rotatable in the housing and mounted on the motor for actuation thereby, a plurality of radial brushes removably mounted in said container, and a depending fork in the cover adapted to be embedded in a potato for suspending said potato in the container between the brushes.

References Cited in the file of this patent

UNITED STATES PATENTS

| 382,549 | Oaks | May 8, 1888 |
| 1,452,738 | Hoberg | Apr. 24, 1923 |

FOREIGN PATENTS

| 103,973 | Australia | May 13, 1938 |